United States Patent [19]
Flynn et al.

[11] 3,761,219
[45] Sept. 25, 1973

[54] DUAL MOLD CLAMPING APPARATUS

[75] Inventors: Joseph C. Flynn, Bridgeton; Walter Panas, Millville; Joseph S. Bonino, Mauricetown, all of N.J.

[73] Assignee: Wheaton Industries, Millville, N.J.

[22] Filed: June 4, 1971

[21] Appl. No.: 150,062

[52] U.S. Cl. ............... 425/249, 425/342, 425/450, 425/DIG. 209
[51] Int. Cl. ............................................ B29d 23/03
[58] Field of Search ............ 425/342, 326 B, 387 B, 425/450, 451, 249

[56] References Cited
UNITED STATES PATENTS

| | | | |
|---|---|---|---|
| 3,632,267 | 1/1972 | Kader | 425/387 X |
| 2,976,569 | 3/1961 | Quere et al. | 425/450 |
| 2,853,736 | 9/1958 | Gussoni | 425/387 |
| 2,916,768 | 12/1959 | Quere et al. | 425/450 |
| 3,100,913 | 8/1963 | De Matteo | 425/324 |
| 3,270,372 | 9/1966 | Hesse | 425/450 |
| 3,659,995 | 5/1972 | La Grutta | 425/326 X |

Primary Examiner—J. Spencer Overholser
Assistant Examiner—Michael O. Sutton
Attorney—Paul & Paul

[57] ABSTRACT

A dual mold clamping apparatus, particularly useful for simultaneously closing two sets of molds and applying additional clamping pressure to one of the sets thereof, having special application in injection blow molding machines. This apparatus comprises mounting means, with extended portions, for the movable halves of each of the mold sets, the extended portions being attached to a common member which moves the movable mold halves in unison in the mold open and mold closed directions. The apparatus further includes selectively engagable means associated with the extended portions of the mold mounting means of one of the mold sets which selectively engagable means is in turn associated with additional mold clamping pressure resistance means and a hydraulic chamber with means for introducing high pressure hydraulic fluid therein for applying additional clamping force pressure through said selectively engagable means both to said additional clamping pressure resistance means and to the movable mold mounting means.

3 Claims, 7 Drawing Figures

DUAL MOLD CLAMPING APPARATUS

INTRODUCTION AND BACKGROUND

This invention relates to a dual mold clamping apparatus wherein additional mold clamping pressure is applied, after mold closure, to less than all of the mold sets. It relates more particularly to injection blow molding machines wherein the injection and blow molds are simultaneously opened and closed by a single mechanism and, after mold closure, additional clamping force is applied to the injection mold.

Molding apparatus, which necessarily includes two or more sets of molds dissimiliar in their function is not uncommon. A typical example is in injection blow molding machines wherein a parison or pre-form is injected under relatively large pressure in an injection mold and, after transfer of the parison or pre-form to a blow mold, a hollow article is blow formed in the blow mold. Substantially less clamping pressure is required on the blow mold. In mass production machines, these functions are often performed simultaneously with one set of parisons being formed while a set formed in the preceding cycle are blown. Simplification of the mold opening and mold closing operation is complicated by the disimiliar loading required of the two sets of molds. Further the use of a hydraulic cylinder capable of exerting the necessary pressure for the clamping force required on the injection mold through the whole mold opening and closing movement of the injection mold is undesirable and inefficient.

These various considerations have resulted in a variety of dual mold clamping apparatus designs all of which tend to be rather complicated and inefficient.

It is therefore an object of the present invention to provide a dual mold clamping apparatus wherein separate mold sets are opened and closed in unison and wherein additional clamping pressure is exerted on one of the mold sets.

It is a further object of this invention to provide a relatively simple means for exerting additional clamping pressure on less than all of the mold sets in an apparatus which includes multiple mold sets and which are otherwise opened and closed in unison.

Still further, it is an object of this invention to provide an injection blow molding machine wherein simple means are provided to open and close the injection and blow molding molds in unison and wherein additional mold clamping force is exerted on the injection mold after the mold closure movement.

Another object of this invention is to provide an effective and simple means for applying additional mold clamping pressure to the injection mold of an injection blow molding machine wherein the injection and the blow molds are otherwise opened and closed by a single relatively simple and inexpensive mechanism.

BRIEF DESCRIPTION OF THE INVENTION

These and other objects, which will become apparent in the course of this subsequent discussion, are met by a dual mold clamping apparatus including mounting means, for respective movable halves of a plurality of mold sets having parallel mold open and mold close movement directions, attached to a common member and a primary mold movement means for moving the movable mold halves into the mold open and mold close positions. This apparatus further includes additional clamping pressure application and resistance means for applying additional pressure to one of the mold sets in its closed position through a selectively engagable force transmitting mechanism wherein the additional clamping pressure on the mold set is transmitted back to and resisted by an additional clamping pressure resistance means independent of and apart from the primary mold movement means.

Generally the selectively engagable means comprises mating interrupted spline members which are movable past one another in their axial direction when disengaged and which are adapted to transmit force in their axial direction when engaged. In one form of the present invention, one of these spline members is associated directly with the movable mold mounting means to which additional clamping force is to be supplied and the other interrupted spline member is associated with a hydraulic cylinder, the opposite end of which is in turn rigidly connected with an additional clamping force resistance means such as a press frame. Alternatively, additional clamping pressure may be produced by a hydraulic chamber formed by two segments of the movable mold mounting means or an extended portion thereof, one of which segments is fixedly connected to the mold mounting means. The other segment is connected to the common member by which the molds are opened and closed in unison and to one of the interrupted spline members, the engagement of which with the other interrupted spline member causes the additional clamping force pressure to be transmitted back through the interrupted spline members to the additional clamping force resistant means rather than to the primary mold movement means.

In the preferred form of the present invention, this dual mold clamping apparatus is incorporated in a turret type injection blow molding machine.

DETAILED DESCRIPTION OF THE INVENTION AND THE PREFERRED EMBODIMENT THEREOF

For a better understanding of the present invention, reference is made to the appended claims and to the following discussion, taken in conjunction with the accompanying drawings, in which:

Figure 1:
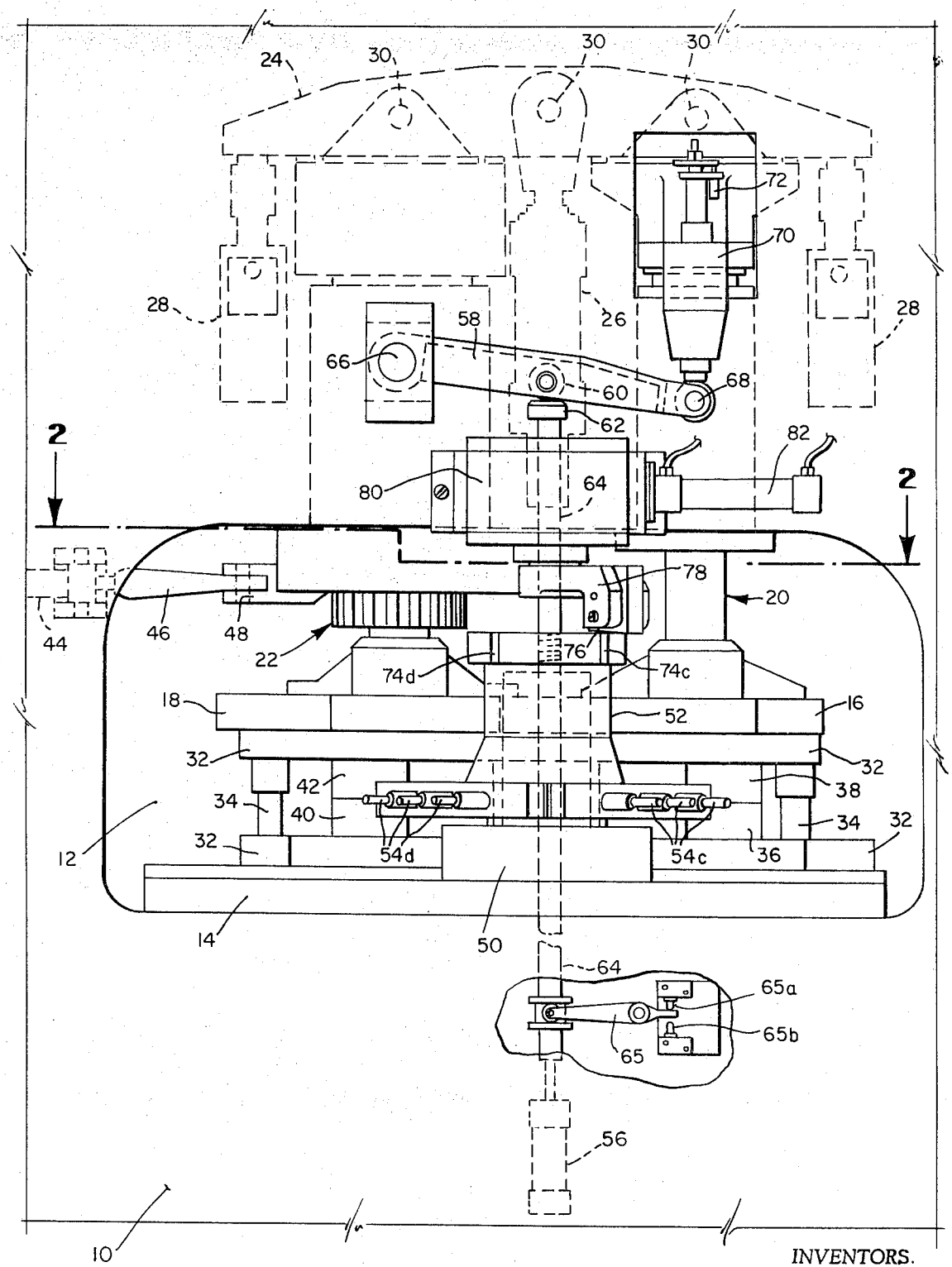
FIG. 1 is a front view of an injection blow molding machine in which is incorporated the dual mold clamping apparatus of the present invention.

Referring specifically now to FIG. 1, there is shown a plate frame structure 10 having an opening 12 therein. On the lower horizontal surface of opening 12 is mounted stationary mold half base 14. Directly above base 14 is movable blow mold half mounting member 16 and movable injection mold half mounting member 18, each attached respectively through connecting means 20 and 22 to yoke member 24 movable vertically by hydraulic piston 26 counterbalanced by constant pressure pneumatic cylinders 28, all of which, except the lower portions of connecting means 20 and 22 and movable mold half mounting members 16 and 18 attached thereto, are enclosed within plate frame structure 10.

Connecting means 20 and 22 and hydraulic piston 26 are all attached by pivotal connections 30 to yoke member 24 in order to provide for any slight vertical movement of connecting means 20 and 22 and piston 26 relative to one another.

Between stationary mold half base 14 and movable mold half mounting members 16 and 18 are disposed mold positioning members 32, guide bars 34, stationary blow mold half 36, movable blow mold half 38, stationary injection mold half 40 and movable injection mold half 42.

Locking piston 44, mounted on plate frame structure 10 and connected through spline connecting members 46 and 48, completes the schematic showing of the dual mold clamping system of the present invention in the schematically illustrated, preferred embodiment injection blow molding machine of FIG. 1.

Also seen in FIG. 1 is turret base 50, with turret positioning pins (not illustrated) thereon, and turret head 52 with four equi-angularly displaced sets of mandrels or core rods 54a–d (a and b not shown in FIG. 1) radially disposed therefrom. (Typically each such set may comprise from 1 to 15 individual core rods or mandrels with the blow molds and injection molds each having a corresponding number of cavities.)

Although not illustrated, the turret head may also have three, rather than four, equi-angularly displaced, radially projecting sets of core rods. In that case, the machine would have one rather than two idle work stations, i.e. stations where core rods are not enclosed by molds for one of the molding operations. Also, the work stations would be displaced 120°, rather than 90°, from adjacent work stations.

Turret head 52 is biased upwardly by constant pressure turret piston 56 on plate frame structure 10 and moved downwardly by lever arm 58 with bearing surface 60 riding on bearing member 62 which is connected through shaft 64 to turret head 52.

Limit switch 65, by making and breaking electrical contact with contacts 65a and 65b, indicates when turret head 52 is in the up or down position. When limit switch 65 indicates that turret head 52 is up, it sequences the press to index. When turret head 52 is indicated to be down, various functions are initiated at the respective work stations disposed around turret head 52.

Lever arm 58 is pivotally mounted at one end 66 to plate frame structure 10 and at the other end 68 to an appendage 70 movable with movable blow mold half connecting means 20. Overpressure switch 72 signals when an excessive load is placed on lever arm 58, such as may be caused by mis-indexing, machine jamming or a foreign object coming between the molds. The signal from switch 72 breaks a circuit, interrupting operation of the machine, and causes the press to open immediately.

Indexing of turret head 52 is accomplished when turret head 52 moves upward, as controlled by piston 56 and lever arm 58, and one of the slots 74a–d (a and b not shown in FIG. 1) is engaged by flag member 76 attached to radial arm 78 of indexing mechanism 80. Indexing mechanism 80 with actuator 82, may consist of a conventional indexing means, such as a hydraulically operated rack and gear or a roller with track and cam follower. It may also consist (as it does in the preferred embodiment of the present invention) of an invention of T. C. Wheaton, III and Walter Panas, entitled Turret Indexing Means, of common assignment herewith, which is fully disclosed and claimed in a separate patent application, Ser. No. 104,359, filed Jan. 6, 1971 which is incorporated herein by reference.

Figure 2:
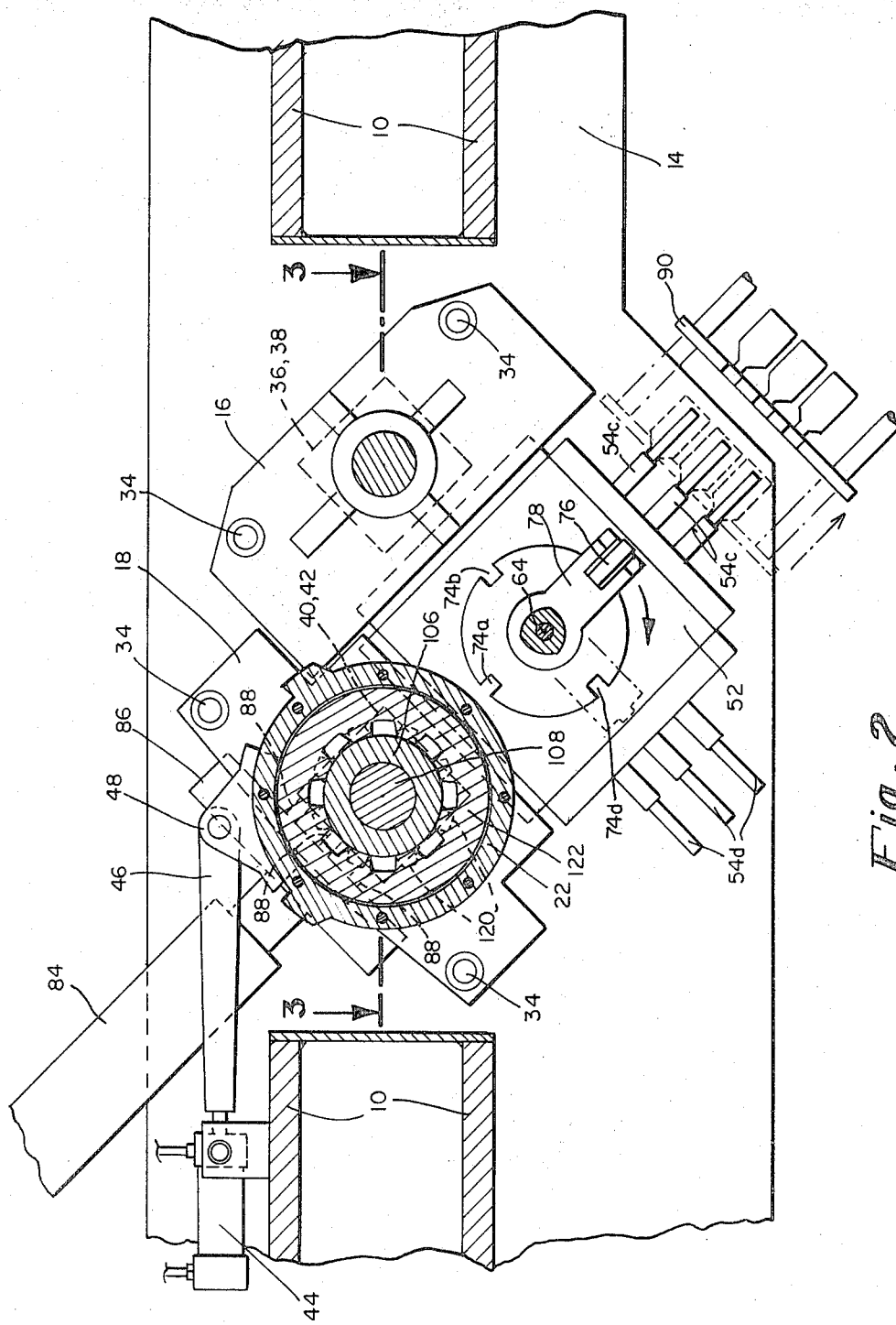
FIG. 2 is a sectional plan view of the machine shown in FIG. 1 in the plane 2—2.

Turning now to FIG. 2, which is a sectional plan view of the machine shown in FIG. 1 and in which like elements are numbered accordingly, there is further shown a portion of a conventional plastification and injection means 84 terminating in melt manifold 86 having individual nozzles 88 mating with and feeding individual cavities in injection mold 40, 42. Conventional plastification and injection means 84 may comprise, for example, a feed hopper, a heated barrel, and a longitudinally movable extruder screw therein, the barrel terminating in a primary nozzle mating in a suitable recess of manifold 86.

Also seen in FIG. 2 is an ejector mechanism 90 for removing blown bottles from core rod set 54c.

As best seen in FIG. 2, locking piston 44 and spline connecting members 46 and 48 are adapted to rotate interrupted spline member 122 through a limited angular displacement about the axis of connecting means 22 so that in one position (as shown) the inward projections thereof engage the outward projections of interrupted spline member 120 and through such engagement are positioned to transmit compressive force therebetween. In the alternative position (not shown) of interrupted spline segments 120 and 122, reached by reverse movement of piston 44, members 46 and 48 and interrupted spline member 122, these projections mate with interruptions in the mating spline and permit the splined members to move past one another along their common axis, as explained in more detail hereinafter.

Figure 3:
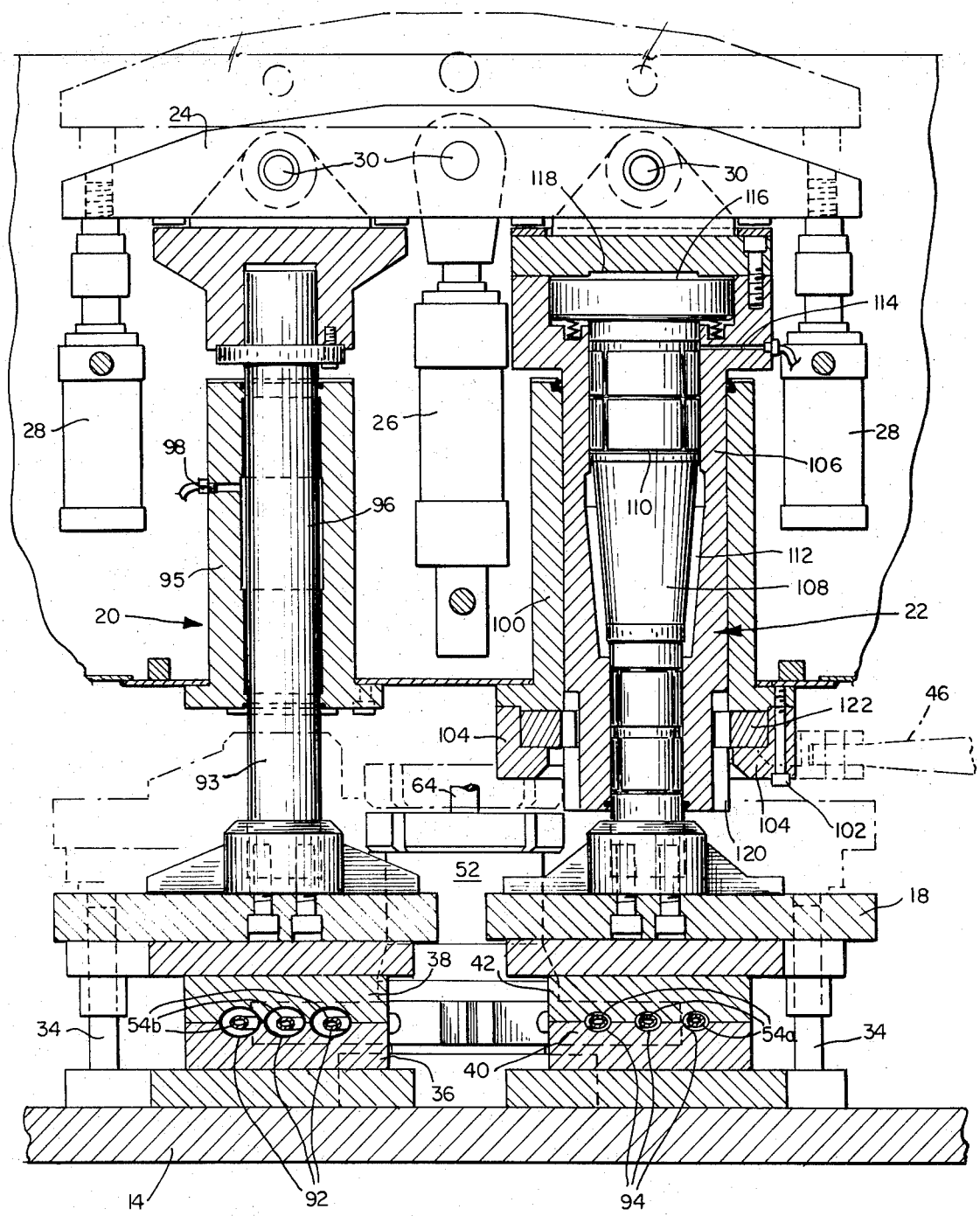
FIG. 3 is an expanded sectional side view of the machine shown in FIGS. 1 and 2 in the plane 3—3, showing specifically and in detail the preferred embodiment of the dual mold clamping apparatus of the present invention.

The dual mold clamping system of the present invention, particularly the preferred form thereof, is shown in more detail in FIG. 3, which is a sectional side view, in the plane 3—3 of FIG. 2 and in which like elements are numbered as in FIGS. 1 and 2. Additional details seen in FIG. 3 are blow mold cavities 92 and injection mold cavities 94 with core rod sets 54a and b therein. Phantom lines are used to show the upper limit of the movable mold half mounting members 16, 18 and turret head 52 in their raised or open position.

As shown in FIG. 3, connecting means 20 includes an extended member 93 vertically movable in guide means 95, mounted in plate frame structure 10, with a suitable lubricant space 96 and lubrication port 98.

Connecting means 22, which connects movable injection mold half mounting means 18 with yoke member 24, also moves vertically within a frame mounted guide means 100. Guide means 100 is also rigidly connected, such as by retainer bolts 102, to spline retainer ring 104.

Connecting means 22 consists of a cylindrical member 106, attached to yoke member 24, and disposed generally within cylindrical member 106 is piston member 108, attached to movable injection mold half mounting means 18. Members 106 and 108 are slightly vertically movable with respect to one another. To provide for that movement there are lubricant channels 110, lubricant space 112, and lubrication port 114.

Upper surface 116 of piston member 108 and lower surface 118 of cylindrical member 106 define between them a hydraulic chamber for the periodic introduction thereinto, by a suitable port means not shown in FIG. 3, of high pressure hydraulic fluid.

About the periphery of the lower extremity of cylindrical member 106 is an interrupted circumferential spline member 120. Associated therewith and also with guide means 100 connected to plate frame structure 10 is a second interrupted spline member 122 rotatably actuable through connecting member 46 by locking piston 44 (seen in FIGS. 1 and 2 but not shown in FIG. 3).

Figure 4:
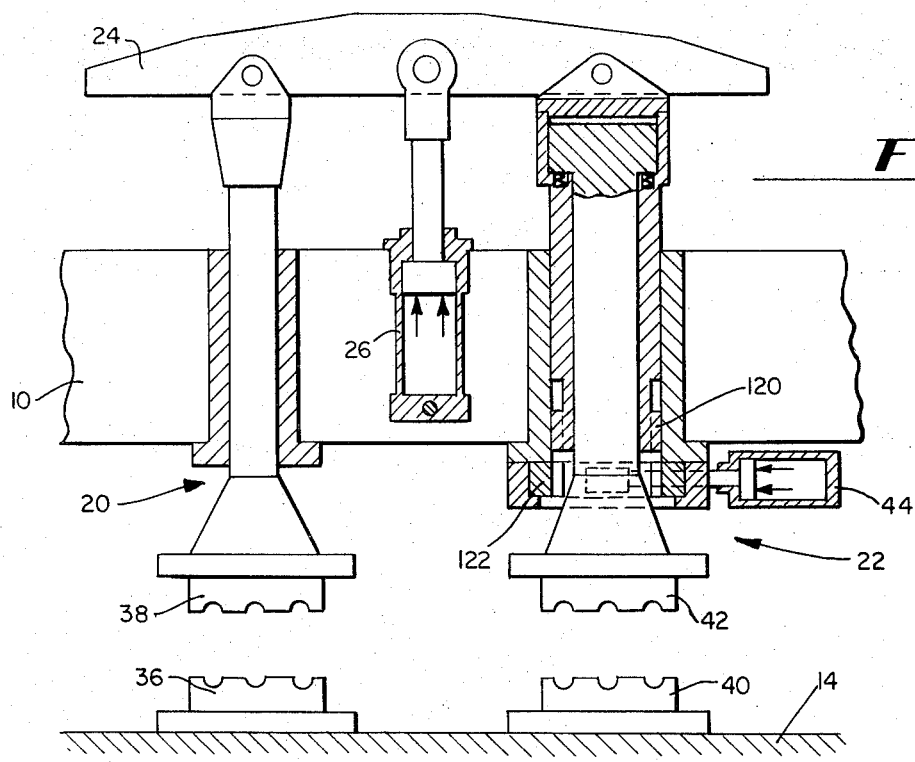
FIGS. 4 and 5 are sequential schematic views of the preferred embodiment of the views of the dual mold clamping system of the present invention.
Figure 5:
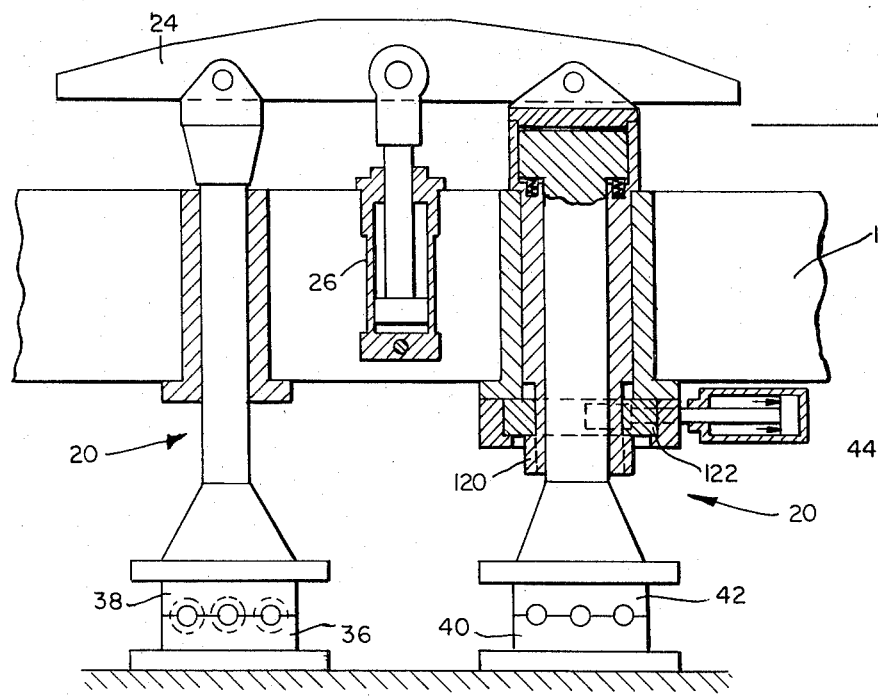

As better seen in the sequential schematic views of FIGS. 4 and 5, interrupted spline members 120 and 122, when unengaged, permit upward movement of the piston 108-cylinder 106 assembly (FIG. 4) into the mold open position and reverse movement into the mold closed position (FIG. 5). As seen in FIG. 5, upon mold closure, locking piston 44 is actuated to engage interrupted spline members 120 and 122.

Figure 6:
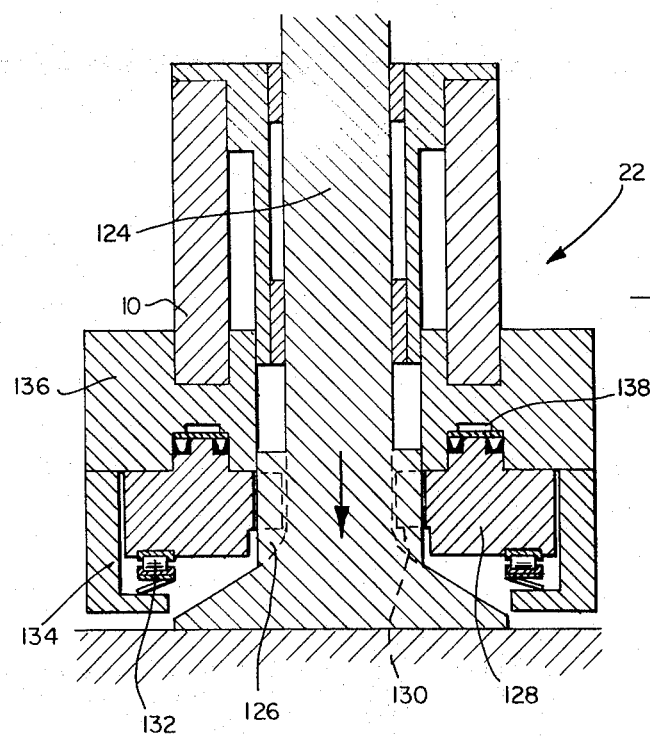
FIGS. 6 and 7 are sequential schematic views of an alternative embodiment of the dual mold clamping system of the present invention.
Figure 7:
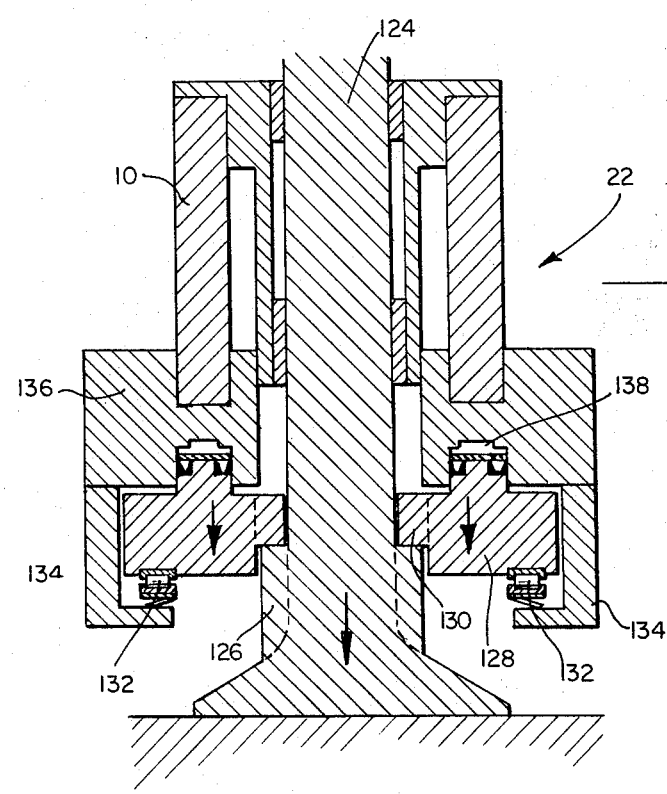

As an alternative to the embodiment of the invention seen in FIGS. 1-5 there is shown, in the sequential schematic views of FIGS. 6 and 7, an alternative form of connecting means 22 comprised of a single extended member 124 having an interrupted spline member 126 disposed about its periphery near its lower end.

An annular member 128 including inwardly projecting interrupted spline member 130 is rotatably movable for engagement and disengagement of interrupted spline members 126 and 130 as in the previously described embodiment. This rotational movement is facilitated by upward biasing means 132 in retainer ring 134.

Annular member 128 and frame structure member 136 define between them a high pressure hydraulic chamber 138, which also includes a means for introducing high pressure hydraulic fluid into chamber 138.

With regard to the operation of the apparatus illustrated in FIGS. 1-7, starting with the molds in their closed position, plastic material is injected by plastification and injection means 84 into injection mold cavities 94 forming parisons or bottle pre-forms about the mandrels or core rods of set 54a. The molds are then opened by actuation of hydraulic piston 26 moving yoke member 24 and mold mounting members 16 and 18 in unison.

Turret head 52 is simultaneously raised by turret piston 56 as the upward movement of lever arm 58 in unison with the mold opening mechanism actuated by hydraulic piston 26 permits it to do so. Slot 74a is thereby engaged with flag 76, and indexed through 90° by indexing means 80. The molds and turret head 52 are then lowered (and the molds closed) by reversal of the mold opening movement previously described. A second set of parisons are then formed on the next adjacent core rod set 54d while the parisons formed in the preceding cycle are blow formed into hollow bottles in blow mold cavities 92 by the introduction of high pressure fluid, such as compressed air, through the core rods of set 54a. The mold is then opened and the cycle repeated with the blown bottles formed in the preceding cycle removed by ejector mechanism 90 while the second set of parisons is blown in cavities 92 and still another set of parisons are formed in cavities 94. The cycle is then repeated indefinitely.

In each such cycle, interrupted spline members 120 and 122 (or 130 and 132 in the alternative embodiment shown in FIGS. 6 and 7) are disengaged when the molds are in their open position. Upon mold closure, the interrupted spline members are engaged by actuation of locking piston 44 and high pressure hydraulic fluid is introduced into the chamber defined by surfaces 116 and 118 (or members 128 and 136 in the alternative embodiment of FIGS. 6 and 7). This produces additional clamping force downward on movable injection mold half 42 transmitted through the engaged interrupted spline members and resisted, independent of yoke member 24, directly by frame structure 10.

After the parisons have been formed the high pressure hydraulic fluid is released, the interrupted spline members are disengaged and the movable injection mold half 42 together with connecting means 22 is free to move upward in unison with yoke member 24 and movable blow mold half 38 under the influence of hydraulic piston 26.

As will be understood by those skilled in the art, the present invention, while described with reference to specific embodiments thereof, is not limited thereto. Generally speaking in fact, this invention has applications in any apparatus which includes multiple mold sets with common mold open and mold close directional movements and in which less than all of the mold sets require additional clamping pressure in the closed position beyond that of which the mold closure mechanism is capable. In any such apparatus, the present invention can be used to good advantage since it permits the use of a light, fast, reliable and unitary mold movement means for all of the molds as well as the independent application of additional clamping force to the selected mold sets which require such additional clamping force. The appended claims are intended to cover all such embodiments and applications of this invention as well as the numerous minor variations and modifications of this invention which would be obvious to those skilled in the art.

What is claimed is:

1. An injection blow molding apparatus comprising
   a. means for injecting plastic material into at least one parison mold consisting of upper and lower mold halves and a mandrel centrally disposed therein,
   b. means for forming hollow articles from parisons formed in said parison molds consisting of at least one blow mold with upper and lower mold halves and means for introducing into said parison through said mandrel a fluid under pressure,
   c. one half of each of said injection and blow molds being mounted on co-planar stationary surfaces, the other halves of each of said injection and blow molds being mounted on respective mold mounting means movable in unison through attachment to a common member associated with a primary mold movement means into mold open and mold closed positions,
   d. means for transferring said mandrels with parisons molded thereon from said injection molds to said blow molds while said molds are in said mold open position,
   e. means for applying additional clamping pressure to said movable half of said injection mold in the mold closed position, said means including (1) additional clamping pressure resistance means independent of said primary mold movement means and common member associated therewith, and (2) selectively engageable means for applying and transmitting additional clamping pressure to said additional clamping pressure resistance means and to said movable injection mold half mounting means wherein said selectively engageable means comprises two mating circumferential interrupted spline members, one of which is reciprocably movable about their common axis to effect engagement and disengagement thereof, said members being freely movable past one another in their axial direction when disengaged and adapted to transmit forces in their axial direction when engaged, said movable injection mold half mounting means having a center line of pressure coincident with said axis of said spline members, wherein said movable injection mold half mounting means is attached to said common member through an extended portion about the periphery of which is disposed one of said interrupted spline members.

2. Apparatus, as recited in claim 1, wherein said extended portion comprises two segments slightly movable with respect to one another in the mold open and mold close direction, said segments defining between them a hydraulic chamber, one of said segments being fixedly connected to said mold mounting means and the other of said segments being fixedly connected to said common member and to said interrupted spline member, the other of said interrupted spline members engaging said additional clamping pressure resistance means so as to transfer resistance force from said hydraulic chamber thereto, said apparatus also including means to introduce hydraulic fluid under pressure into said hydraulic chamber.

3. Apparatus, as recited in claim 2, wherein one of said segments comprises a cylindrical member surrounding the other of said segments, said cylindrical member being closed at one end, said closure, said cylindrical member, and said enclosed segment together with seals between them defining said hydraulic chamber.

* * * * *